Nov. 24, 1964  W. E. BELL  3,158,803
APPARATUS FOR MONITORING MAGNETIC FIELD GRADIENTS
Filed Feb. 21, 1962
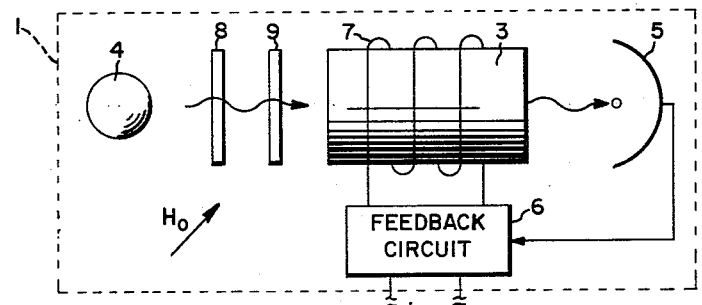
FIG.1
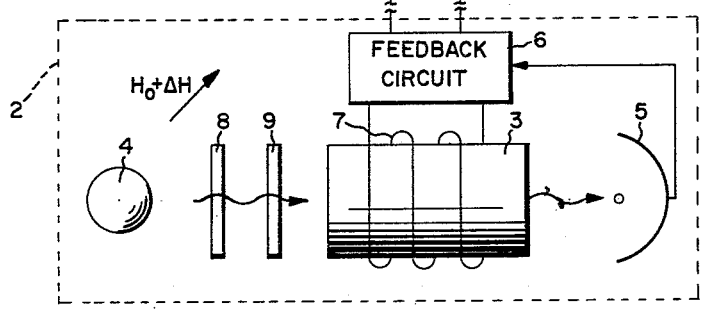
FIG.2
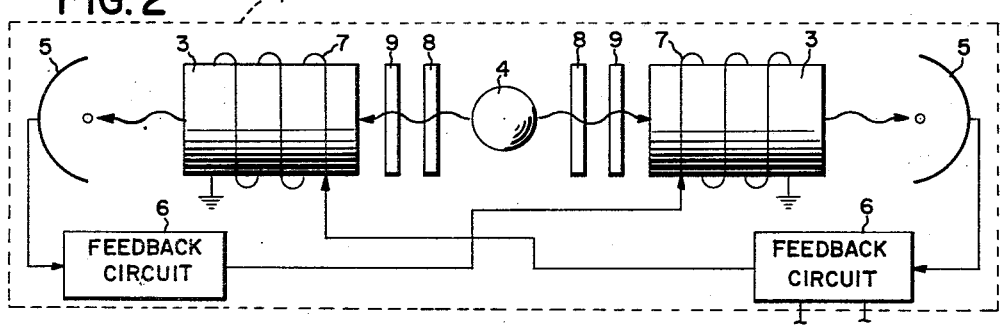
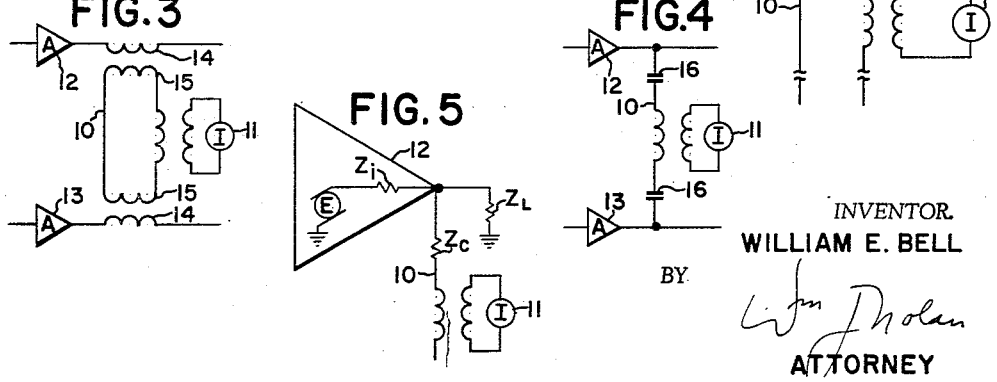
INVENTOR.
WILLIAM E. BELL
BY
ATTORNEY

United States Patent Office 3,158,803
Patented Nov. 24, 1964

3,158,803
APPARATUS FOR MONITORING MAGNETIC FIELD GRADIENTS
William E. Bell, Palo Alto, Calif., assignor to Varian Associates, Palo Alto, Calif., a corporation of California
Filed Feb. 21, 1962, Ser. No. 174,919
3 Claims. (Cl. 324—.5)

The present invention relates in general to oscillators whose frequency of operation is precisely controlled by the magnetic resonance properties of a sensing sample, and more particularly to a novel technique for combining the outputs of two such oscillators to obtain a sensitive indication of the magnetic field gradient existing between the sensing sample location of each oscillator.

One such oscillator of particular interest, disclosed and claimed in U.S. patent application Serial No. 653,180 filed April 16, 1957, assigned to the same assignee, now U.S. Patent 3,150,313, utilizes the ability of a gas or vapor sample undergoing magnetic resonance transistions to modulate a beam of optical resonance radiation passing therethrough. The modulation frequency is determined by the transition frequency, and the transition frequency, in turn, is a function of the static intensity of the magnetic field at the sample. Thus, by feeding the detected intensity modulation of the radiation back to the sample in the form of an alternating magnetic field which regeneratively induces resonance transitions, self-sustaining oscillation is established at a frequency precisely responsive to the intensity of the field. It is one of the principal objects of the present invention to use oscillators of this type for the sensitive detection of small magnetic field gradients, such as would be created, for example, in the earth's field by a hidden magnetic body.

One feature of the present invention is the provision of means for locking together the oscillations of two magnetic resonance oscillators.

Another feature of the present invention is the provision of means in accordance with the preceding paragraph wherein said locking means includes a transmission line on which circulating currents are established.

These and other features and advantages of the present invention will be more apparent after a perusal of the following specification taken in connection with the accompanying drawing wherein, FIG. 1 is a circuit diagram of a gas cell gradiometer in accordance with the present invention, FIG. 2 is a circuit diagram of a modification for the gradiometer of FIG. 1, FIGS. 3 and 4 are circuit diagrams of two particular types of coupling networks for the gradiometer of FIGS. 1 and 2, and FIG. 5 is an equivalent circuit diagram representing a general class of coupling networks which may be used in the gradiometer of FIGS. 1 and 2.

The gradiometer of FIG. 1 comprises two spaced-apart magnetometer oscillators 1 and 2, each oscillator comprising a gas cell 3, a lamp 4 for irradiating said gas cell with the optical resonance radiation of the gas or vapor sample in the cell, and a photodetector 5 for transforming intensity modulations of the transmitted radiation into a signal which is amplified in feedback circuit 6 and applied to coil 7 to create a magnetic field of proper phase for regeneratively inducing magnetic resonance transitions therein.

For purpose of description the gas cell is considered to be filled with an alkali metal vapor such as rubidium mixed with an inert buffer gas, the lamp 4 providing a beam of the resonance radiation of the vapor which is directed by a suitable lens system (not shown) at an acute angle (preferably 45°) to the external unidirectional magnetic field $H_0$, and which passes through an interference filter 8 which removes the $D_2$ ($S_{1/2} \to P_{3/2}$) line from the resonance radiation and a circular polarizer 9 before entering the gas cell 3. It should be understood, however, that other samples and optical systems may be used. For example, the gas cell may contain helium gas excited by a discharge to the $2^3S_1$ metastable state and irradiated by unfiltered helium resonance radiation.

In operation, the polarized and filtered radiation cannot be absorbed by the gas cell atoms in a magnetic sublevel in which the magnetic moments of the atoms point in a certain preferred direction relative to the field $H_0$ so that a net magnetic moment or magnetization is built up in the gas cell by a process known as "optical pumping" wherein atoms in the absorbing sublevels are raised to an optically excited state and then fall back into the non-absorbing sublevel. Any component in alternating magnetic field of coil 7 which is at a frequency which coincides with the frequency separation between the magnetic sublevels will induce coherent transition between sublevels, such transitions corresponding to a precession of the net magnetic moment of the gas cell about $H_0$ at the transition frequency. This magnetic moment alternately points one way and then the other with reference to the light beam axis so that the atoms in the excessively populated sublevel become alternately absorbing and then nonabsorbing. As a result, the light passing through the gas cell is intensity modulated at the precession or transition frequency. This intensity modulation generates a signal in photocell 5 at the precession frequency which is amplified and fed back through circuit 6 to maintain forced precession thereby establishing self-sustained oscillation at the precession frequency. The coil 7 is preferably wound coaxially about the light beam axis to minimize orientation-dependent effects and in this case the necessary phase shift through photocell 5 and feedback circuit 6 for oscillation is 90°. The oscillation frequency for a gas cell enriched in $Rb^{85}$, for example, is 7.00 cycles per gamma of field intensity.

According to the present invention, the two oscillators 1 and 2 are phase-locked as a result of being loosely bilaterally coupled together by a transmission line 10. If a small gradient $\Delta H$ exists between the location of the two oscillators, they will tend to oscillate at slightly different frequencies. In view of the transmission line coupling, however, they are pulled together in frequency as a consequence of a circulating reactive current $i$ (at the locked oscillation frequency) flowing between the two oscillators, the amplitude of this current varying directly with the magnitude of the gradient $\Delta H$. This circulating current is detected, as by inductive coupling to an ammeter 11, to provide a sensitive indication of the gradient $\Delta H$.

FIG. 2 shows another form of magnetometer oscillator which may be used in the system of FIG. 1. Here oppositely directed beams are passed through separate gas cells 3 and the intensity modulation due to each gas cell is cross-coupled to the coil 7 encircling the opposite gas cell to complete the oscillating loop. As described in U.S. patent application Serial No. 62,480 filed October 13, 1960, assigned to the same assignee, such a cross-coupled arrangement has the advantage of permitting the system to continue in oscillation when the instrument is rotated from one magnetic hemisphere to the other, and also of reducing heading errors due to asymmetries in the resonance line.

Still another suitable type of magnetometer oscillator is disclosed in U.S. patent application Serial No. 95,581, assigned to the same assignee. In this type, magnetic resonance is induced in the gas cell by intensity modulating the optical pumping light at or near the resonance frequency prior to irradiating the gas cell.

FIG. 3 shows one particular form of coupling network for locking the oscillators in a gradiometer according to FIGS. 1 and 2. The output of amplifiers 12 and 13, each located in a feedback circuit 6 of a separate one of the oscillators, has a coupling coil 14 which provides bilateral inductive coupling to a coil 15 at each end of the transmission line 10. Another particular form is shown in FIG. 4 wherein the output of amplifiers 12 and 13 are coupled via series capacitors 16.

A general formulation for coupling the amplifiers 12 and 13 is obtained from FIG. 5. The amplifier is represented by an equivalent circuit of a voltage source E and an internal series impedance $Z_i$. The load impedance presented to the amplifier is represented by $Z_L$. The condition for suitable loose phase-locked coupling between the two oscillators is $$\frac{1}{Z_c} \ll \frac{1}{Z_i} + \frac{1}{Z_L}$$

One particularly desirable arrangement is that which permits the amplifier to operate as a constant current source, that is, $Z_i \gg Z_L$, as in this case the signal coupled into the transmission line is at a high level.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for monitoring magnetic field gradients comprising: first and second magnetic resonance oscillators having first and second sensing samples respectively being disposed in spaced-apart relation, each said oscillator being adapted to generate an output frequency signal dependent upon the strength of an external magnetic field passing through each said sample; means bilaterally coupling together the output circuits of said oscillators so that each said oscillator oscillates phase-locked to the other said oscillator at a common output frequency whereby a signal is derived in variable accordance with the difference between the strength of the magnetic field passing through said first sample and the strength of the magnetic fluid passing through said second sample; and monitoring means responsive to said derived signal for measuring said difference between the strength of said magnetic field existing at each said sample.

2. Apparatus according to claim 1 wherein said coupling means includes a transmission line extending between said oscillators, said derived signal has the amplitude of circulating currents on said line, and said monitoring means includes means responsive to the amplitude of said circulating currents on said line.

3. Apparatus according to claim 2 wherein said first and second magnetic resonance oscillators each comprise: a sample of a gas or vapor, a source of the optical resonance radiation of said gas or vapor for irradiating said sample, and means responsive to the intensity modulation of optical radiation issuing from said sample for regeneratively inducing magnetic resonance transitions in said sample.

References Cited in the file of this patent

UNITED STATES PATENTS

| | | |
|---|---|---|
| 2,440,503 | Fay | Apr. 27, 1948 |
| 2,916,690 | Leete | Dec. 8, 1959 |

FOREIGN PATENTS

| | | |
|---|---|---|
| 875,242 | Great Britain | Aug. 16, 1961 |